United States Patent [19]

Penzel et al.

[11] Patent Number: 5,624,748
[45] Date of Patent: Apr. 29, 1997

[54] PACKAGING MATERIALS HAVING BARRIER PROPERTIES AGAINST OXYGEN

[75] Inventors: Erich Penzel; Hermann Seyffer, both of Heidelberg; Eberhard Beckmann, Neustadt; Norbert Sendhoff, Grünstadt, all of Germany

[73] Assignee: BASF Aktiengesellschaft, Ludwigshafen, Germany

[21] Appl. No.: 523,798

[22] Filed: Sep. 5, 1995

[30] Foreign Application Priority Data

Sep. 9, 1994 [DE] Germany .................. 44 32 080.9

[51] Int. Cl.$^6$ ........................................ B32B 15/08
[52] U.S. Cl. ............... 428/336; 427/388.4; 427/391; 427/393.5; 427/409; 427/411; 427/412.1; 428/458; 428/461; 428/480; 428/481; 428/511
[58] Field of Search .............. 427/388.4, 391, 427/393.5, 409, 411, 412.1; 428/336, 458, 461, 480, 481, 511

[56] References Cited

U.S. PATENT DOCUMENTS

| | | | |
|---|---|---|---|
| 4,251,641 | 2/1981 | Arakawa et al. | 525/36 |
| 4,281,068 | 7/1981 | Frank et al. | 521/62 |
| 4,579,890 | 4/1986 | Domeier | 523/512 |
| 4,691,002 | 9/1987 | Hegemann et al. | 528/289 |
| 4,880,700 | 11/1989 | Charmot et al. | 428/337 |
| 4,996,252 | 2/1991 | Phan et al. | 524/88 |

FOREIGN PATENT DOCUMENTS

| | | |
|---|---|---|
| 0003337 | 8/1979 | European Pat. Off. . |
| 0101864 | 3/1984 | European Pat. Off. . |
| 0260203 | 3/1988 | European Pat. Off. . |
| 0356341 | 2/1990 | European Pat. Off. . |
| 92/12195 | 7/1992 | WIPO . |

*Primary Examiner*—Michael Lusignan
*Attorney, Agent, or Firm*—Oblon, Spivak, McClelland, Maier & Neustadt, P.C.

[57] ABSTRACT

Packaging materials are produced by a process which comprises coating substrates suitable for packaging with an aqueous solution or emulsion which contains a copolymer A) composed of a) from 10 to 100% by weight of an ethylenically unsaturated $C_3$–$C_5$-carboxylic acid or $C_3$–$C_5$-di-carboxylic acid or anhydrides or half-esters of the dicarboxylic acids, b) from 0 to 50% by weight of an ethylenically unsaturated compound having at least one sulfo or sulfonate group and c) from 0 to 70% by weight of further monomers, and a polyester B) and, if required, then applying further top coats.

9 Claims, No Drawings

PACKAGING MATERIALS HAVING BARRIER PROPERTIES AGAINST OXYGEN

BACKGROUND OF THE INVENTION

1. Field of the Invention

The present invention relates to a process for the production of packaging materials. Food, drugs, cosmetics and other sensitive and readily spoiled products must be packed in such a way that they are protected from gases and moisture. To date, packaging materials having coatings based on chlorine-containing copolymers have been used for this purpose. However, chlorine-containing products are becoming increasingly undesirable.

2. Discussion of the Background

Aqueous emulsions which contain polyacrylates and polyesters are disclosed, for example, in WO-92/12195 and U.S. Pat. No. 4,996,252. The emulsions are used as or in printing inks.

SUMMARY OF THE INVENTION

It is an object of the present invention to provide packaging materials having good barrier properties against oxygen. The packaging materials should not lose their barrier properties even under the action of moisture.

Furthermore, the packaging materials should, if required, have top coats which ensure, for example, high gloss, good printability and sealability.

We have found that this object is achieved by a process for the production of packaging materials, which comprises coating substrates suitable for packaging with an aqueous solution or emulsion which contains a copolymer A) composed of a) from 10 to 100% by weight of an ethylenically unsaturated $C_3$–$C_5$-carboxylic acid or $C_3$–$C_5$-di-carboxylic acid or anhydrides or half-esters of the dicarboxylic acids, b) from 0 to 50% by weight of an ethylenically unsaturated compound having at least one sulfo or sulfonate group and c) from 0 to 70% by weight of further monomers, and a polyester B) and, if required, then applying further top coats.

We have also found packaging materials which are obtainable by such a process.

In the novel processes, an aqueous solution or, preferably, emulsion which contains a copolymer A) obtained by free radical polymerization and a polyester B) is applied to suitable substrates.

DETAILED DESCRIPTION OF THE PREFERRED EMBODIMENTS

Copolymer A) is preferably composed of from 10 to 80, particularly preferably from 10 to 50, % by weight of monomers a), from 10 to 50, particularly preferably from 10 to 40%, by weight of monomers b) and from 10 to 70, particularly preferably from 30 to 60, % by weight of monomers c).

Monomers a) are, for example, acrylic acid, methacrylic acid, itaconic acid, maleic acid, fumaric acid or the half-esters of dicarboxylic acids or mixtures thereof. Carboxylic acids or dicarboxylic acids are particularly preferred, especially acrylic acid or methacrylic acid.

The carboxyl groups may also be present in neutralized form, ie. as a salt.

Ethylenically unsaturated compounds (b) are, for example, 2-sulfoethyl methacrylate, 2-acrylamido-2-methylpropanesulfonic acid, 3-sulfopropyl acrylate, 3-sulfopropyl methacrylate, bis(3-sulfopropyl) itaconate and mixtures thereof. 2-Sulfoethyl methacrylate and 2-acrylamido-2-methylpropanesulfonic acid are particularly preferred.

The further monomers c) may be, for example, hydroxyalkyl (meth)acrylates, amides of ethylenically unsaturated carboxylic acids, in particular of the abovementioned $C_3$–$C_5$-carboxylic acids or dicarboxylic acids, or $C_1$–$C_{20}$-alkyl (meth)acrylates, vinyl esters of carboxylic acids of up to 20 carbon atoms, vinylaromatics of up to 20 carbon atoms, ethylenically unsaturated nitriles and aliphatic hydrocarbons having 2 to 8 carbon atoms and 1 or 2 double bonds or mixtures thereof.

Examples are alkyl (meth)acrylates having a $C_1$–$C_{10}$-alkyl radical, such as methyl methacrylate, methyl acrylate, n-butyl acrylate, ethyl acrylate and 2-ethylhexyl acrylate.

Mixtures of the alkyl (meth)acrylates are also particularly suitable.

Vinyl esters of carboxylic acids of 1 to 20 carbon atoms are, for example, vinyl laurate, vinyl stearate, vinyl propionate and vinyl acetate.

Suitable vinylaromatic compounds are vinyltoluene, α- and p-methylstyrene, α-butylstyrene, 4-n-butylstyrene, 4-n-decylstyrene and preferably styrene.

Examples of nitriles are acrylonitrile and methacrylonitrile.

Examples of nonaromatic hydrocarbons having 2 to 8 carbon atoms and one or two olefinic double bonds are butadiene, isoprene and chloroprene, as well as ethylene, propylene and isobutylene.

The further monomers are also preferably used as a mixture.

Particularly preferred further monomers c) are those which have a glass transition temperature above 20° C. (determined according to ASTM 3418/82 by differential thermal analysis or differential scanning calorimetry).

(Meth)acrylonitrile, the abovementioned amides or hydroxyalkyl (meth)acrylates, for example $C_1$–$C_{10}$-hydroxyalkyl (meth)acrylates, are particularly preferred as further monomers c).

The monomers a) to c) are preferably chosen so that the minimum film formation temperature of A) is below 50° C., particularly preferably below 35° C. The LT value of the aqueous emulsion of A) is preferably above 85, preferably above 90%.

The particle size of the aqueous emulsion is characterized by the LT value. This is the light transmittance of an emulsion diluted to 0.01% by weight at a path length of 2.5 cm and a wavelength of the incident light of 0.546 μm in comparison with pure water.

The minimum film formation temperature (MFT) indicates the lowest temperature at which a crack-free film is still formed. It is determined on a test bench with a temperature gradient, as stated in DIN 53 787 (1974).

The copolymers A) can be prepared, for example, in an aqueous medium by the known emulsion polymerization methods.

All anionic and/or nonionic emulsifiers usually used for emulsion polymerization may be employed as emulsifiers. Sodium laurylsulfate, sodium $C_{15}$-paraffinsulfonate, sodium dodecylbenzenesulfonate, sodium salts of the sulfuric esters of the reaction products of alkylphenols with ethylene oxide and the sodium salt of $C_{12}$-alkyl diphenyl ether disulfonate are preferably used. The amounts are preferably from 0.5 to 3%, based on the monomers.

Conventional water-soluble compounds which form free radicals may be used as initiators. Alkali metal persulfates and hydrogen peroxide, alone or in combination with water-soluble reducing agents, such as ascorbic acid, sodium sulfite or the adduct of sodium sulfite to formaldehyde, are preferred. If redox initiator systems are used, the presence of heavy metal salts, eg. iron(II) sulfate, is advantageous.

The polymerization temperature may be, for example, from 20° to 95° C. but is preferably from 50° to 85° C.

The polymerization may also be carried out in the presence of regulators. Conventional regulators are sulfur compounds, such as dodecyl mercaptan or esters of thioglycolic acid.

The water-soluble, preferably water-dispersible, polyester B) is a condensate of polyols, preferably diols, and polycarboxylic acids, preferably dicarboxylic acids, or mixtures of dicarboxylic acids with tricarboxylic acids. Instead of the polycarboxylic acids, esters or anhydrides of the polycarboxylic acids may also be used as starting components for the condensation.

Examples of the polyols are $\alpha,\omega$-aliphatic glycols of 2 to 12 carbon atoms, eg. ethylene glycol, 1,3- or 1,2-propylene glycol, 2,4-dimethyl-2-ethylhexane-1,3-diol, 2,2-dimethyl-1,3-propanediol, 2-ethyl-2-butyl-1,3-propanediol, 1,3- and 1,4-butanediol, 1,5-pentanediol, 1,6-hexanediol or neopentylglycol, cycloaliphatic diols, such as 1,2-, 1,3- and 1,4-bis(hydroxymethyl)cyclohexane, dianhydrosorbitol, dianhydromannitol or 4,4'-isopropylidenebisphenol (bisphenol A), and polyethylene glycols of the general formula $H-(OCH_2-CH_2)_n-OH$, such as diethylene glycol, triethylene glycol, tetraethylene glycol and higher polyalkylene glycols having a degree of polymerization n of up to 20 (Pluriol brands), and mixtures thereof.

It is also possible to use polyols, in particular diols, which additionally contain a sulfonate or carboxyl group, such as sulfonic acid derivatives of glycerol, as described in French Patent 2,318,184. The amount of these polyols may be, for example, from 0 to 30% by weight, based on the total amount of polyols.

Cycloaliphatic glycols are preferred. Glycols of 2 to 6 carbon atoms, polyethylene glycols having a degree of polymerization of from 5 to 15 and 1,4-bis(hydroxymethyl) cyclohexane and mixtures thereof are particularly preferred.

Examples of polycarboxylic acids and of the anhydrides or esters thereof are terephthalic acid, isophthalic acid, phthalic acid, tert-butylisophthalic acid and the methyl or ethyl esters thereof, as well as aliphatic $\alpha,\omega$-dicarboxylic acids, such as succinic acid, adipic acid, sebacic acid or iraconic acid, and mixtures thereof.

The polycarboxylic acids are preferably dicarboxylic acids which contain no further acid group, and from 0 to 65, preferably from 5 to 50, particularly preferably from 5 to 30, % by weight, based on the polycarboxylic acids, of dicarboxylic acids which additionally carry a sulfo or sulfonate group or polycarboxylic acids having a higher functionality, in particular tricarboxylic acids.

Examples of the latter are sulfophthalic acid, sulfoterephthalic acid, sulfoisophthalic acid, 4-sulfonaphthalene-2,7-dicarboxylic acid or mellitic acid, pyromellitic acid or trimellitic anhydride and mixtures thereof.

In the polycarboxylic acids used, sulfo groups are present in general in neutralized form, ie. as a sulfonate group.

Preferred polycarboxylic acids are terephthalic acid and isophthalic acid, and the sodium salt of sulfoisophthalic acid and trimellitic anhydride and mixtures thereof are also preferred.

The amount of the polyols is preferably from 20 to 60% by weight, and that of the polycarboxylic acids or the anhydrides or esters thereof is from 40 to 80% by weight, based in each case on the components of the polyester B).

The molar ratio of the carboxyl groups of the polycarboxylic acids (including anhydride or ester groups corresponding to the carboxyl groups from which they are derived) to the hydroxyl groups of the polyols is preferably from 1:0.7 to 1:1.5, particularly preferably about 1:1.

The polyester B) preferably has a minimum film formation temperature of less than 50° C., particularly preferably less than 30° C., a glass transition temperature of from 0° to 100° C., particularly preferably from 15° to 60° C., and an acid number of from 0 to 200, particularly preferably from 0 to 100. The LT value of the polyester is preferably more than 75%.

The polyester is preferably prepared by the known melt condensation process. The starting materials are combined in a reaction vessel and heated to 200°–250° C. The catalyst used is preferably an organometallic compound, such as an alkylstannic acid or an alkyl titanate, eg. triisopropyl titanate. Butylstannic acid is particularly preferred. The amount of the catalyst is preferably from 0.05 to 5% by weight, based on the polyester.

Preferably, dicarboxylic acids are first reacted with the diols until the desired acid number is reached. The water formed is preferably distilled off under reduced pressure. Dicarboxylic acids having sulfo groups, for example sulfoisophthalic acid, or tricarboxylic acids or the anhydrides thereof, eg. trimellitic anhydride, are preferably then added and the reaction is continued until the desired final acid number is reached.

For the preparation of the emulsion, water can then be stirred into the hot melt or the melt can be discharged into water. If required, the acid groups are then neutralized with, for example, amines, ammonia or alkali metal hydroxides.

Aqueous emulsions or solutions of the copolymer A) and of the polyester B) may be mixed in order to obtain an aqueous solution, preferably emulsion, which contains the copolymer A) and the polyester B).

The amount of the copolymer A) is preferably from 30 to 95, particularly preferably from 50 to 90, % by weight and that of the polyester B) is from 5 to 70, particularly preferably from 10 to 50, % by weight, based in each case on the sum of A)+B).

The polymer content (sum of A)+B)) of the aqueous solution or emulsion is preferably from 5 to 35, particularly preferably from 15 to 30, % by weight, based on the aqueous emulsion or solution. The aqueous solution or emulsion is preferably essentially free of organic solvents.

In the novel process, substrates suitable for packaging are coated with the aqueous solution or emulsion of the copolymer A) and polyester B) (referred to below as polymer emulsion for short). Suitable substrates are in particular films, for example of plastic, metal or paper.

The polymer emulsion can be used directly for coating. The polymer emulsion may be applied to a substrate film comprising a plastic, a metals-or paper, for example on a coating apparatus. If web-like materials are used as the substrate film, the polymer emulsion is usually applied from a trough by means of an applicator roll and leveled with the aid of an airbrush. Another possible method for applying the coating to the substrate film is by the reverse gravure process. In order further to improve the adhesion to the film, the substrate film may be subjected beforehand to corona treatment. The amounts of polymer emulsion applied to the sheet-like materials are, for example, preferably from 1 to 10, particularly preferably from 2 to 7, g (solid polymer)/m² in the case of films (or from 10 to 30 g/m² in the case of paper). After the application of the polymer emulsion to the sheet-like substrates, the water is evaporated. For example, in the continuous procedure this may be effected by passing the substrate film through a drying tunnel, which may be equipped with an infrared irradiation apparatus. The coated and dried film is then passed over a cooling roll and finally wound up. The thickness of the dried coating is preferably from 1 to 50 µm, particularly preferably from 2 to 20 µm.

The substrates coated with the polymer emulsion have an excellent barrier effect against oxygen, even under the action of moisture. The coated substrates as such can be used as packaging materials. The coatings have very good mechanical properties and exhibit, for example, gloss, transparency and good blocking behavior and essentially no cracking.

In order to obtain special surface or coating properties of the packaging materials, for example good printability, even better sealing and blocking behavior and good water resistance, it may be advantageous to overcoat the substrates coated with the oxygen barrier with top coats which additionally impart these desired properties. The substrate precoated with the oxygen barrier has good overcoating properties. After a process mentioned above, it can be overcoated again or repeatedly coated in a continuous process without intermediate winding and unwinding of, for example, the film. The oxygen barrier layer is thus in the interior of the system, and the surface properties are then determined by the top coat. The top coat has good adhesion to the oxygen barrier layer.

By means of the process described, it is possible in a simple manner to produce oxygen-impermeable coatings, for example on films of oriented polypropylene or polyethylene, where the latter may have been produced either by the high pressure or the low pressure ethylene polymerization process. Examples of other suitable substrate films are films of polyesters, such as polyethylene terephthalate; and films of polyamide, polystyrene and polyvinyl chloride. Papers and metal foils, such as aluminum foils, are also suitable as substrate films. The thickness of the substrate films is in general from 10 to 200 µm, and from 30 to 50 µm in the case of polyamide films, from 10 to 40 µm in the case of polyethylene terephthalate films, about 200 µm in the case of polyvinyl chloride films and about 20 µm in the case of polystyrene films.

Testing of the performance characteristics of film coatings having oxygen barrier properties 1. Oxygen permeability The oxygen permeability is determined for coatings on an oriented polypropylene film at 0% and 50% relative humidity. The oxygen permeability is first measured and is then converted to a layer thickness of 100 µm and expressed as oxygen permeability in cm³/m²-d-bar, where d is the time in days. The determination is carried out similarly to ASTM-D 3985-81.

2. Appearance of coating

The coating quality is assessed visually. Coatings containing specks or those having many wetting defects cannot be used for further investigations. The usable coatings must be clear, transparent and very substantially non-blocking.

3. Water toleration

A drop of water is placed on the coatings and the latter are evaluated for blooming and tack. In the case of good water toleration, the coating is neither opaque nor tacky.

4. Adhesion to the film

A commercial adhesive strip is stuck on the coating, pressed down firmly and torn off abruptly. If this causes the coating to be detached from the film and to adhere to the adhesive strip, the film adhesion is rated as poor. The adhesion is rated as good if the adhesive strip is detached without damaging the coating.

5. Overcoatability

The overcoatability is assessed visually. It is poor if the base coat is detached or superficially dissolved on overcoating with the top coat or if there are incompatibilities with the top coat.

6. Sealability

The coated samples are sealed, coat against coat, for 0.25 second with a contact pressure of 2.5 bar at 100°, 110°, 120° and 130° C. The sealing jaws measure 150×10 mm and the resulting pressure is 0.25 N/mm².

The sealed sample is cut into individual test specimens (usually 7), each being 15 mm wide. The seal strength (SS) is measured by means of a computer-controlled tearing machine at a tear rate of 150 mm/min. The fracture pattern is also assessed visually: NS=no seal, POS=parting of the seal, PS=partial seal, FS=full seal and FT/PT=film-paper tear.

7. Blocking behavior

The blocking behavior is assessed as being sufficient when the films resting against one another under their own weight (coated side/coated side) do not adhere to one another. Very poor blocking behavior leading to unsuitability for use occurs when the wound film (coated side/back) can be unwound only with damage to the coating.

Preparation of the aqueous emulsion A

Copolymer A1

324.6 g of water and 10 g of sodium peroxodisulfate were initially taken in a polymerization vessel and heated to the polymerization temperature of 75° C. Feeds I and II were then introduced into the reaction vessel at the polymerization temperature.

Feed I was introduced in the course of 2 hours. Feed II was started after 1.5 hours and was likewise added in the course of 2 hours.

After a further 3 hours, the mixture was cooled to room temperature.

Feed I: 658.0 g of water 11.1 g of a 45% strength aqueous solution of the sodium salt of a $C_{12}$-alkyl diphenyl etherdisulfonic acid 125.0 g of acrylonitrile (50% by weight) 100.0 g of acrylic acid (40% by weight) 25.0 g of 2-acrylamido-2-methylpropanesulfonic acid (10% by weight)

Feed II: 25.0 g of water 2.5 g of sodium peroxodisulfate.

The solids content of the resulting aqueous polymer emulsion A1 was 20.2%. Its pH was 1.2 and the LT value was 98%. The minimum film formation temperature was <5° C.

Copolymer A2

The procedure was as stated in Example A1, except that the initially taken mixture now contained 475 g of water and 14.8 g of sodium peroxodisulfate, and the feeds had the following composition:

Feed I: 950.0 g of water 16.4 g of a 45% strength aqueous solution of the sodium salt of a $C_{12}$-alkyl diphenyl etherdisulfonic acid 148.0 g of acrylonitrile (40% by weight) 111.0 g of acrylic acid (30% by weight) 111.0 g of 2-sulfoethyl methacrylate (30% by weight)

Feed II: 100.0 g of water 3.7 g of sodium peroxodisulfate.

The solids content of the resulting aqueous polymer solution A2 was 20.5%. Its pH was 1.0 and the LT value was 100%. The minimum film formation temperature was <4° C.

Preparation of the water-dispersible polyester B

Polyester B1

68.9 g (0.65 mol) of diethylene glycol and 50.5 g (0.35 mol) of 1,4-bis(hydroxymethyl)cyclohexane were initially taken in a dry reaction vessel and heated to 80° C.

At this temperature, 121.2 g (0.73 mol) of isophthalic acid and 21.6 g (0.13 mol) of terephthalic acid were added and the mixture was heated further to 135° C. 0.3 g (0.1%) of butylstannic acid was also added as a catalyst. The mixture was then heated to 230° C. in the course of 4 hours, water distilling off. The reaction temperature was kept at from 230° to 235° C. for a further 4 hours until the resulting polyester had reached an acid number of from 1.5 to 3 mg KOH/g. The pressure decreased to a final value of from 1 to 5 mbar. At this acid number, the mixture was cooled to 200° C. and 28.8 g (0.15 mol) of trimellitic anhydride were added. The reaction mixture was then stirred at from 200° to 205° C. until it had an acid number of 50 mg KOH/g. A mixture of 600 g of water, 10.4 g (0.11 mol) of triethanolamine and 9.1 g (0.134 mol) of 25% strength ammonia were stirred very slowly into the hot melt. The temperature decreased and was kept at 90° C. Stirring was carried out for a further 4 hours at 90° C., after which the mixture was cooled to room temperature.

The polyester emulsion B1 had a solids content of 30%. Its pH was 6.8 and the LT value was 82%. The minimum film formation temperature was less than 5° C. The glass transition temperature was 36° C. The acid number was 50 mg KOH/g.

Polyester B2

The procedure was as in Example B1, except that in this case the following starting substances were used: 90 g (1.44 mol) of ethylene glycol, 76 g (0.72 mol) of diethylene glycol, 54 g (0.36 mol) of triethylene glycol, 176 g (1.06 mol) of isophthalic acid, 130 g (0.78 mol) of terephthalic acid and 75 g (0.28 mol) of sulfoisophthalic acid (sodium salt). 1 g of butylstannic acid was used as the catalyst.

The water-dispersible polyester B2 had a solids content of 25%. Its pH was from 3 to 7 and the LT value was about 100%. The minimum film formation temperature was less than 5° C. The glass transition temperature was 28° C. The acid number was from 0 to 20 mg KOH/g.

Example of a coating

First, an oriented polypropylene (PP) film (Mobil, grade MB 200, about 20 μm thick) was electrically pretreated (Corona, 0.4 A, 30 m/min) on a pilot plant (Dixon No. 160). In the second step, in order to improve the adhesion, the corona-treated film was coated with a solution (methyl ethyl ketone, toluene) of a 2-component polyurethane primer (Adcote 376 A from Morton Int.), diluted to a solids content of 5%. The application system was an air brush, and the amount applied was adjusted to 0.5 $g/m^2$ by means of the air pressure applied. The coating speed was 30 m/min and the drying tunnel was about 4 m long and was heated to 105° C. After passing through the dryer, the film was wound up again.

In the third step, 18% strength by weight polymer emulsions were applied in a similar manner, the coat weight being adjusted to 3 to 4 $g/m^2$ and the drying temperature being 120° C. An IR preliminary drying unit was included in the system. The film coated in this manner was wound up again.

Test results for the film are shown in Table 1.

| Polymer | % by weight** | $O_2$ permeability (T = 23° C.) 0% relative humidity | 50% relative humidity | Appearance of coating | Film adhesion | Overcoat-ability |
|---|---|---|---|---|---|---|
| A1* | 100 | 0.08–0.17 | >>1000*** | poor | poor | no |
| B2* | 100 | 12 | >100 | good | good | yes |
| A1/B2 | 85/15 | 0.15–0.21 | 0.17–0.25 | good | good | yes |
| A2* | 100 | 0.15 | >>1000*** | poor | poor | no |
| B1* | 100 | 8.9 | >100 | good | good | yes |
| A2/B1 | 83/17 | 0.13–0.50 | 0.48–0.56 | good | good | yes |

*for comparison
**based on the sum of copolymer A + polyester B (solid)
***not measurable since highly $O_2$-permeable To further improve the performance characteristics, the film coated with the emulsion A1/B2 was overcoated. To ensure better adhesion between the top coat and the barrier layer, an adhesion promoter was applied beforehand by the method described above and was dried (the aqueous dispersion used was Acronal® DS 2296X, diluted to a solids content of 40%, coat weight 2.5 $g/m^2$, dried at 120° C.). In the final step, the emulsion which imparts the desired surface properties to the film, for example sealability, blocking resistance and resistance to water and to oil, was applied. In this example, the top coat was Acronal DS 2316X (45% strength emulsion, coat weight 2 $g/m^2$). The assessment is shown in Table 2.

TABLE 2

| | Application of top coat |
|---|---|
| Coating of the film: | 1) OPP (about 20 μm), Corona-treated |
| | 2) PU primer (0.5 $g/m^2$) |
| | 3) Barrier layer (3.6 $g/m^2$) |
| | 4) Adhesion promoter (2.5 $g/m^2$) |
| | 5) Overcoat (2 $g/m^2$) |

TABLE 2-continued

Application of top coat

| O₂ permeability | of the barrier layer | of the total coat |
|---|---|---|
| 0% relative humidity, 23° C. | 0.09 | 0.29 |
| 50% relative humidity, 23° C. | 0.22 | 0.58 |
| 90% relative humidity, 23° C. | 0.35 | 1.20 |
| 0% relative humidity, 38° C. | 0.22 | 0.56 |
| 50% relative humidity, 38° C. | 0.42 | 1.35 |

| Sealing temperature | Seal strength |
|---|---|
| 90° C. | 0.9–1.3 N (separation only with damage to the coat) |
| 100° C. | tearing of film 2.4 N |
| 110° C. | tearing of film 2.4 N |
| 120° C. | tearing of film 3.0 N |
| 130° C. | tearing of film 2.8 N |

Sealability: Seal strength in N/15 mm, sealing for 0.25 s at 2.5 bar contact pressure
Adhesion to film: very good, an adhesive strip peeled off abruptly does not tear the coat
Appearance of coat: (very) good, transparent, glossy
Water toleration: (very) good, a drop of water causes no opacity

We claim:

1. A process for the preparation of packaging materials, which comprises coating substrates suitable for packaging with an aqueous solution or emulsion which contains a copolymer A) composed of a) at least 10% by weight of an ethylenically unsaturated $C_3$–$C_5$-carboxylic acid or $C_3$–$C_5$-dicarboxylic acid or anhydrides or half-esters of the dicarboxylic acids, b) from an effective copolymerizing amount to 50% by weight of an ethylenically unsaturated compound having at least one sulfo or sulfonate group and c) from 0 to 70% by weight of further monomers, and a polyester B).

2. A process as claimed in claim 1, wherein the minimum film formation temperature of the copolymer A) and of the polyester B) is less than 50° C.

3. A process as claimed in claim 1, wherein the aqueous emulsion or solution contains from 30 to 95% by weight of the copolymer A) and from 70 to 5% by weight of the polyester B), based on the sum of A)+B).

4. A process as claimed in claim 1, wherein copolymer A) is composed of from 10 to 50% by weight of the monomers a), from 10 to 40% by weight of the monomers b) and from 30 to 60% by weight of the monomers c).

5. A process as claimed in claim 1, wherein the polyester B) is an essentially linear polyester having sulfo or sulfonate or carboxyl or carboxylate groups and an acid number of from 0 to 200 mg KOH/g of polyester.

6. A process as claimed in claim 1, wherein the substrates suitable for packaging are plastic films, metal foils or paper.

7. A process as claimed in claim 1, wherein the coating has a thickness of from 1 to 50 μm after drying.

8. A process as claimed in claim 1, wherein at least one top coat is applied to the coating obtained.

9. Packaging material prepared by a process as claimed in claim 1.

\* \* \* \* \*